(12) United States Patent
Lee et al.

(10) Patent No.: US 7,872,970 B2
(45) Date of Patent: Jan. 18, 2011

(54) METHOD FOR SELECTING A DETERMINATOR OF PRIORITY TO ACCESS A NETWORK

(75) Inventors: Kyung Ju Lee, Gyeonggi-do (KR); Yu Kyoung Song, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 12/093,575

(22) PCT Filed: Nov. 14, 2006

(86) PCT No.: PCT/KR2006/004765

§ 371 (c)(1),
(2), (4) Date: Oct. 6, 2008

(87) PCT Pub. No.: WO2007/055549

PCT Pub. Date: May 18, 2007

(65) Prior Publication Data

US 2009/0080330 A1    Mar. 26, 2009

Related U.S. Application Data

(60) Provisional application No. 60/736,781, filed on Nov. 14, 2005.

(51) Int. Cl.
*H04L 12/26* (2006.01)
*G06F 15/173* (2006.01)

(52) U.S. Cl. .................... 370/230; 709/225
(58) Field of Classification Search .............. None
See application file for complete search history.

(56) References Cited

U.S. PATENT DOCUMENTS

| 5,606,595 A | 2/1997 | Ejzak |
| 7,545,753 B2 * | 6/2009 | Stirbu ............... 370/252 |
| 2002/0087711 A1 | 7/2002 | Leung |
| 2003/0204596 A1 * | 10/2003 | Yadav ............... 709/226 |
| 2004/0153699 A1 | 8/2004 | Goldsmith |
| 2005/0228894 A1 * | 10/2005 | Takabayashi et al. ...... 709/229 |

OTHER PUBLICATIONS

UPnP Forum, UPnP QoS Architecture:1.0, Mar. 10, 2005.*
UPnP Forum, QosPolicyHolder1.0, Mar. 10, 2005.*

* cited by examiner

*Primary Examiner*—Ricky Ngo
*Assistant Examiner*—Clemence Han
(74) *Attorney, Agent, or Firm*—Lee, Hong, Degerman, Kang & Waimey

(57) ABSTRACT

The present invention relates to technology for determining priority when an access to a network, e.g., UPnP-based home network is requested. An illustrative method according to the present invention sets one priority determinator among a plurality of determinators to default one, and asks the default priority determinator priority information on a connection for traffic when the connection is requested to be allowed.

20 Claims, 3 Drawing Sheets

METHOD FOR SELECTING A DETERMINATOR OF PRIORITY TO ACCESS A NETWORK

CROSS-REFERENCE TO RELATED APPLICATIONS

Figure 1:
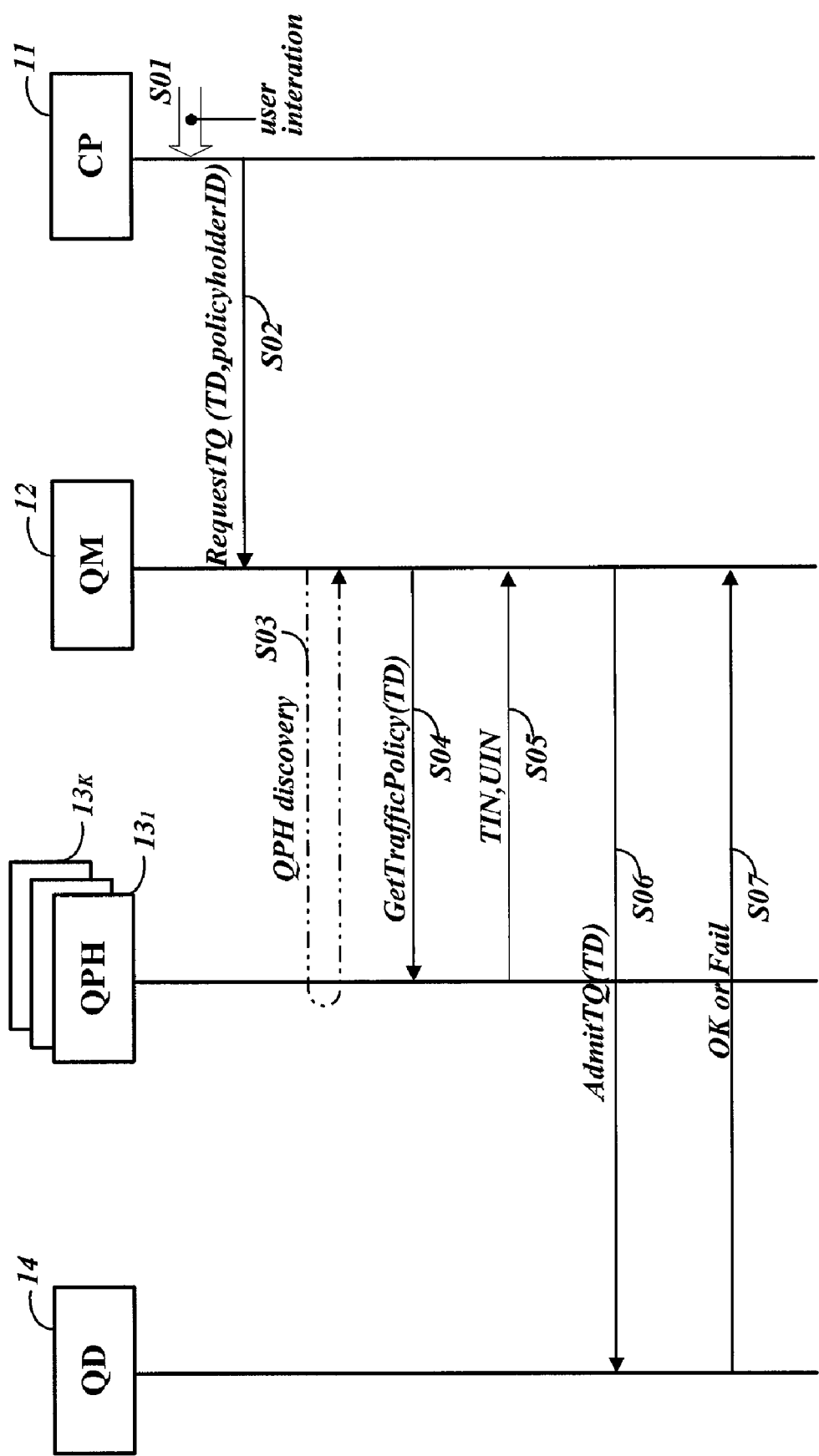

Pursuant to 35 U.S.C. §371 this application claims the benefit of earlier filing date and right of priority to International Application No. PCT/KR2006/004765, filed on Nov. 14, 2006, which claims the benefit of U.S. Provisional Application No. 60/736,781, filed on Nov. 14, 2005, the contents of which are hereby incorporated by reference herein in their entirety.

1. TECHNICAL FIELD

The present invention is related to a technology for determining priority to access a home network, e.g., a home network based on UPnP.

2. BACKGROUND ART

A network based on UPnP™ (hereinafter, it is referred to as UPnP for short.) proposed for home networking, comprises a plurality of UPnP devices, services, and control points. A service on a UPnP network represents a small control unit executed within a device, which is an application modeled by state variables. A CP (Control Point) on a UPnP network represents a control application equipped with functions for detecting and controlling other devices and/or services. A CP can be operated on an arbitrary device, the device being a physical device such as a PDA providing a user with a convenient interface. A CP can also constitute a single device together with another service, e.g., a renderer service which expresses images by rendering media data. Therefore, multiple CPs can exist on a UPnP network and the user can control operations on a desired service by choosing a convenient CP depending on his/her current location or employed device.

Once a home network as above is built in a particular place such as a home, the user can conveniently make use of desired operations (e.g., operations of duplicating or transferring data between separate devices) irrespective of his/her current location; moreover, multiple users can share the same device at the same time, in the same place.

As described above, when multiple users use networked devices simultaneously or sequentially, or multiple tasks are carried out on networked devices simultaneously or sequentially, required quantity of data transmission may exceed transmission bandwidth provided by a network. In this case, network access for data transmission should be restricted, which such restriction should be decided based on priority of the corresponding transmission. Therefore, a service is necessary, which can determine priority of access when the access is requested on a network. In addition, more than one such service can exist on the network.

3. DISCLOSURE OF THE INVENTION

The present invention provides a method for determining traffic priority in a consistent way when a plurality of priority determinators exists on a network.

One method for determining priority to access a network according to the present invention designates one among a plurality of priority determinators as a default priority determinator and at the time of requesting connection permission for traffic, requests priority information about the connection on the designated default priority determinator.

In one embodiment according to the present invention, information about a default priority determinator is stored in all of devices or services managing network QoS in the form of identifying information about the default priority determinator.

In another embodiment according to the present invention, information about a default priority determinator is stored in the priority determinator in the form of information indicating a default priority determinator.

In the above embodiment according to the present invention, at the time of requesting connection permission for traffic, a designated default priority determinator is identified by inquiring into the multiple priority determinators and priority information about the connection is requested on the identified default priority determinator.

In the above embodiment according to the present invention, an action for resetting priority determinators except for the designated priority determinator among the multiple priority determinators is invoked along with designation of the default priority determinator.

In one embodiment according to the present invention, priority information about the designated default priority determinator is requested when information for designating a priority determinator is not contained in information accompanying the connection permission request.

In one embodiment according to the present invention, the priority information consists of priority assigned to traffic and priority assigned to the user.

4. BRIEF DESCRIPTION OF THE DRAWINGS

Figure 2:
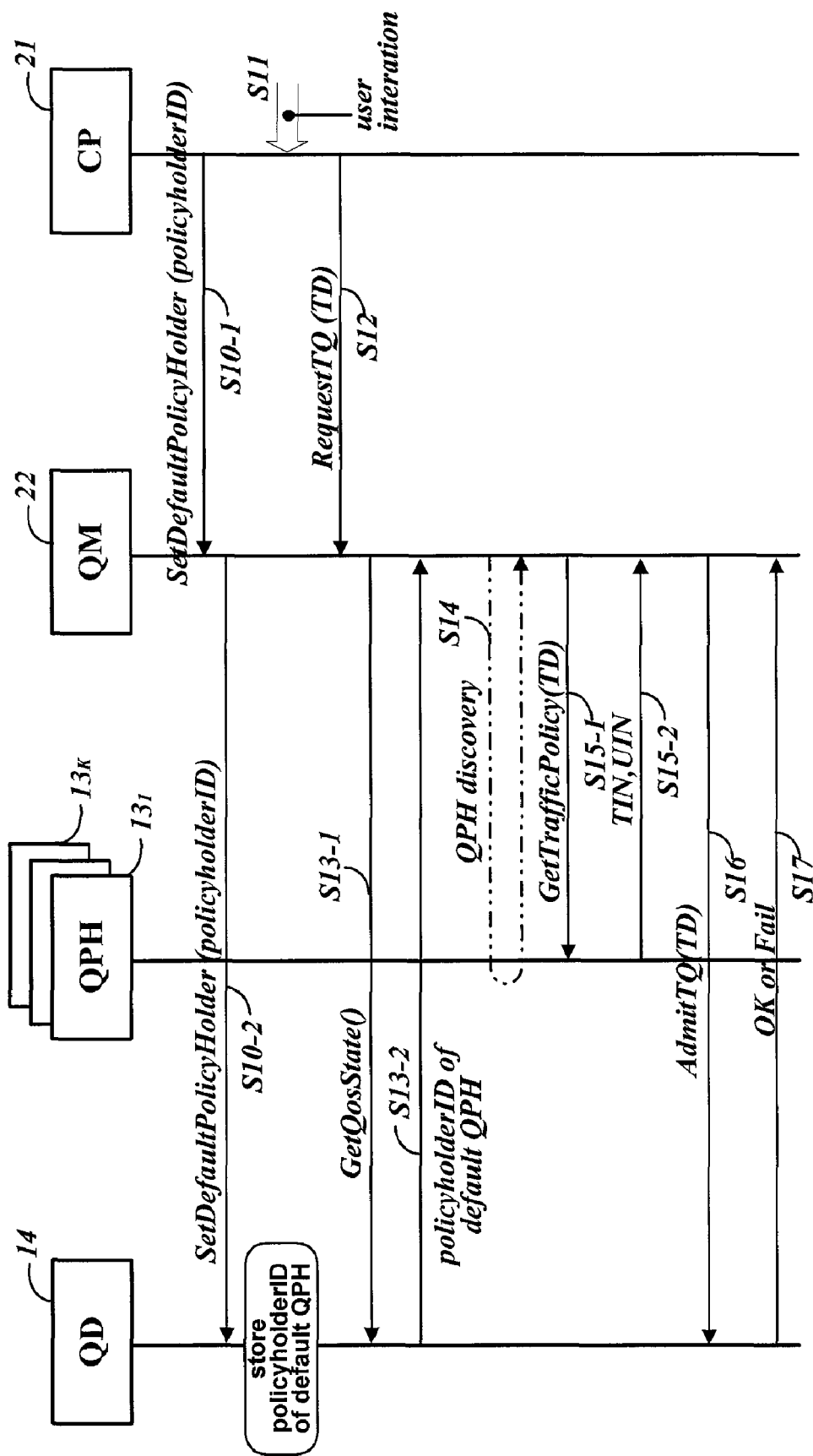
Figure 3:
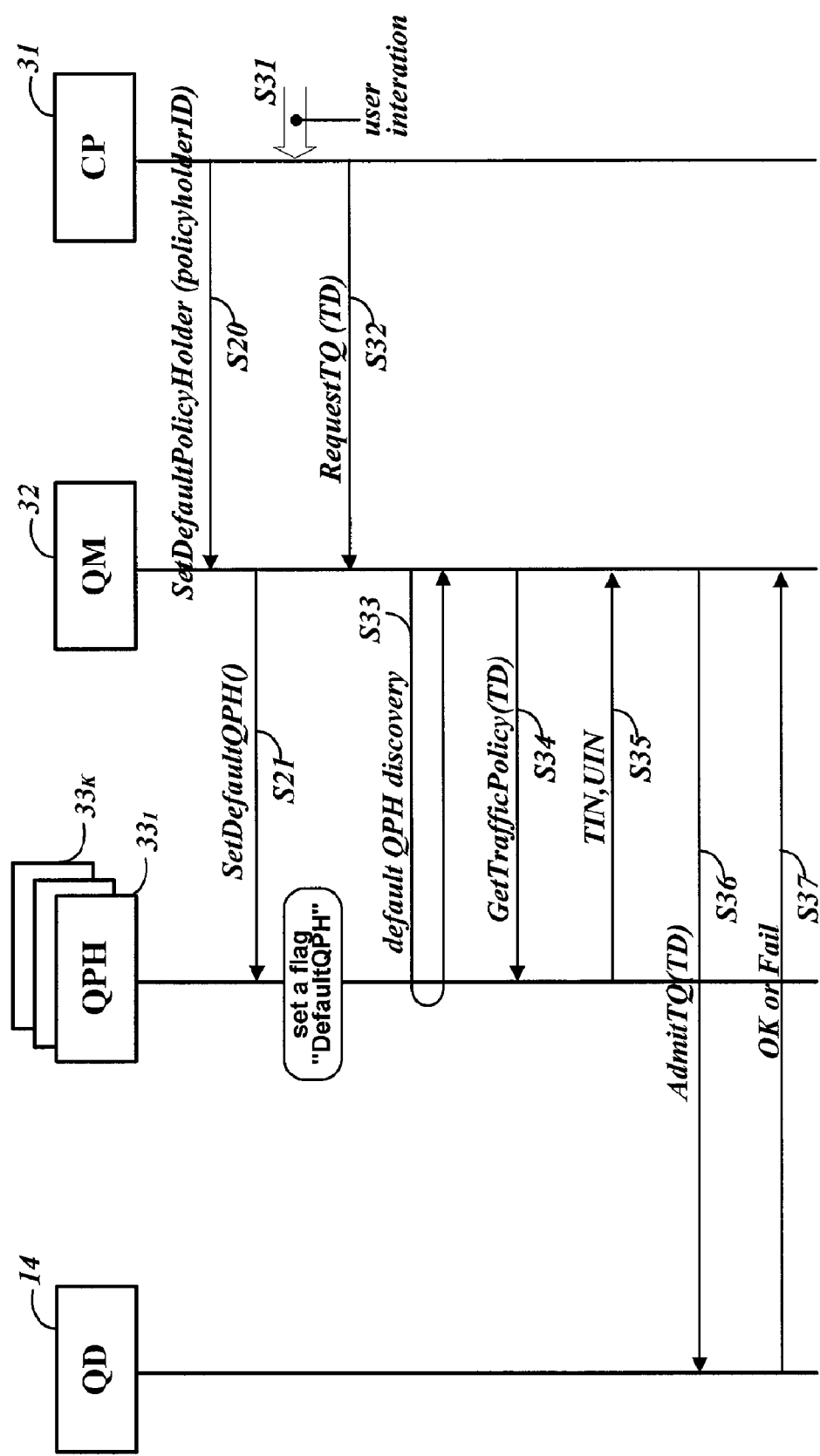

FIG. 1 illustrates a signal exchange procedure between devices (and/or services), through which a network access request for traffic transmission is processed; and FIGS. 2 and 3 respectively illustrate signal exchange procedures between devices (and/or services), through which a network access request for traffic transmission is processed according to an embodiment of the present invention.

5. BEST MODE FOR CARRYING OUT THE INVENTION

Hereinafter, according to the present invention, preferred embodiments of a method and apparatus for securing a video signal recording space will be described in detail with reference to appended drawings.

In one embodiment according to the present invention, at the request for permission of network access for content data transmission, information which describes traffic processing the transmission (which is also called as traffic descriptor and in the following, is referred to as 'TD information' for short) is delivered to a manager which processes/manages access permission request. (Hereinafter, it is referred to as QoS (Quality of Service) manager.) TD information contains type of the corresponding traffic (e.g., information indicating real-time data (streaming data) or non-realtime data), identifying information of a user who requests traffic (e.g., user name), and so on. Tspec information containing information about service rate required for streaming of the corresponding traffic is also included in TD information. The above terms such as TD, Tspec, etc are not main point to the present invention and therefore can be replaced with different terms.

In what follows, embodiments for selecting a priority determinator of network access according to the present invention are described.

FIG. 1 illustrates a signal exchange procedure between devices (and/or services), through which a network access request is processed for traffic transmission. In the following, device and service are collectively referred to as 'device'; the term of 'device' appearing in the following may denote a service depending on a particular application.

The procedure illustrated in FIG. 1 and procedures illustrated in subsequent figures describe only a specific application from among various signal exchange methods carried out between devices in response to the request of network access; principles and purpose of the present invention are not limited to the figures and illustrated procedures in the corresponding description. Therefore, inventions employing different signal exchange methods but utilizing principles and purpose of the present invention should be necessarily considered to belong to the scope of the present invention.

First, when the user issues a traffic connection request for streaming or transmission between devices through a control point 11 (S01), the control point 11 configures TD information for the connection according to the user input or selection information acquired from an appropriate user interface and invokes an action requesting connection permission on QoS manager 12 (S02). As described above, the configured TD information contains type of data requested for access, identifying information about the user (e.g., user name), etc. The control point 11 also puts identifying information (policyholderID) of a QoS policy holder (QPH) for determining priority of requested access in the input argument of an action for requesting connection permission.

The QoS manager 12 which received the action for requesting connection permission checks QoS policy holder identifying information (policyholderID) within input argument information in the action. The QoS manager 12 then requests inquiry of priority information according to previously set traffic policy on the QoS policy holder $13_1$ corresponding to the checked identifier while providing received TD information (S04). Before invocation of the action, the QoS manager 12 may carry out operations for discovering all of QoS policy holders in order to confirm an exact QoS policy holder corresponding to QoS policy holder identifying information within the input argument (S03).

The QoS policy holder $13_1$ which received the inquiry request determines priority information according to a priority determination policy or algorithm previously set thereto. This determination is made by applying information such as identifying information of the user who requested access, type of traffic requested for access (e.g., whether the traffic is intended for A/V data or external call in case of emergency), etc to its policy or algorithm. According to the determination, e.g., information about TIN (Traffic Importance Number) and UIN (User Importance Number) is determined as priority information and this information is returned to the QoS manager 12 in response to the inquiry request (S04), (S05). From returned priority information, UIN is managed by the QoS manager 12 and TIN is inserted to the TD information; the TD information is then carried by an action and permission for accessing a network is requested on a QoS device 14, (S06). The QoS device 14 denotes a source and destination device carrying out traffic transmission of an arbitrary connection, and also applies to the case of multiple devices when other devices exist on a data transmission path between the two devices; in what follows, the term of 'QoS device' should be understood as a device of the above meaning unless otherwise indicated.

The QoS device 14, when it turns out that transmission speed requested by the TD information cannot be met with current remaining bandwidth, returns a FAIL response refusing access request (S07).

When permission to requested access is refused, the QoS manager 12 either notifies the CP 11 of the refusal or again requests the refused access after requesting release of allowed traffic having lower UIN than that of previously received one on the QoS device 14.

In the above embodiment, a QoS policy holder is determined from a plurality of QoS policyholders $13_1, 13_2, \ldots, 13_K$, the determined QoS policy holder being designated by the CP 11 from input argument of a received connection permission request action; priority of requested access is determined by the QoS policy holder. On the other hand, if another user designates a different QoS policy holder by using the CP 11 or different CP, thereby having the different QoS policy holder determine priority of access requested by the user and moreover, if a plurality of QoS policy holders adopt separate priority determination policies or algorithms, priority about traffic on the same network may not be determined by a consistent policy or algorithm.

In the following, another embodiment for consistently determining priority of traffic on the same network according to the present invention is described.

FIG. 2 illustrates a signal exchange procedure between devices, through which a network access request for traffic transmission is processed according to another embodiment of the present invention.

First, when CP 21 discovers a QoS manager 22 on a network, it invokes an action for designating one QoS policy holder $13_1$ as default on the discovered QoS manager 22, (S10-1). Then, the QoS manager 22 invokes an action for designating a default QoS policy holder on all of QoS devices existing on the network (S10-2). Therefore, all of QoS devices on the network store a variable (default_policyholder) designating the same QoS policy holder $13_1$ as a default QoS policy holder. Default QoS policy holder designated by the CP 21 can be set/changed by user option or menu such as environment setting provided by the CP 21.

When traffic connection request for streaming or transmission between devices is issued by the user through the control point 21 after setting a default QoS policy holder as above (S11), the control point 21 configures TD information for the connection according to the user input or selection information acquired from an appropriate user interface and invokes an action for requesting connection permission on the QoS manager 22 (S12). As described above, the configured TD information contains type of data requested for access, identifying information about the user (e.g., username), etc. In the present embodiment, identifying information (policyholderID) of a QoS policy holder determining priority of requested access is not included in the input argument of an action (RequestTQ( )) for requesting the connection permission. What is implied by the fact that identifying information of a QoS policy holder is not included is that the value of a variable policyholderID within input argument of the action is set to 'NULL'.

The QoS manager 22 which received an action for requesting the connection extracts information contained in input argument within the action and checks QoS policy holder identifying information (policyholderID) within the information. When the value of the checked identifier is NULL, the QoS manager 22 invokes an action for inquiring the status of a device (GetQosState( )) on a QoS device 14 (S13-1) and receives information about a QoS policy holder $13_1$ designated by a variable default_policyholder from the QoS device 14, the variable being stored in the QoS manager 22 itself (S13-2). The QoS manager 22 requests inquiry of priority information according to traffic policy on the QoS policy holder $13_1$ designated by received information, while providing received TD information (S15-1). Before invocation of the action, the QoS manager 22 may carry out operations for discovering all of QoS policy holders in order to confirm an exact QoS policy holder corresponding to QoS policy holder identifying information recorded in the variable default_policyholder (S14).

The QoS policy holder $13_1$ which received the inquiry request determines priority information according to a priority determination policy or algorithm previously set thereto. This determination is made by applying information such as identifying information of the user who requested access, type of traffic requested for access (e.g., whether the traffic is intended for A/V data or external call in case of emergency), etc to its policy or algorithm. According to the determination, e.g., information about TIN (Traffic Importance Number) and UIN (User Importance Number) is determined as priority information and this information is returned to the QoS manager 22 in response to the inquiry request (S15-1), (S15-2). From returned priority information, UIN is managed by the QoS manager 22 and TIN is inserted to the TD information; the TD information is then carried by an action and permission for accessing a network is requested on a QoS device 14, (S16).

The procedure of the QoS device's 14 allowing or refusing transmission speed requested by received TD information is the same as that of the embodiment described with reference to FIG. 1. In addition, when request for access permission is refused, the QoS manager 22 processes refusal of the access permission in the same way as the embodiment described with reference to FIG. 1.

According to the embodiment as described above, access permission for traffic can be determined by a priority determination method under the same condition. If the identifying information of a default QoS policy holder is allowed to be changed by the CP 21, the user can change the identifying information into a different QoS policy holder from the one currently set on a network by using user option or environment setting provided by the CP 21. Also, while a single default QoS policy holder is designated and maintained, determination of priority for access requested on the network is performed according to the same policy or algorithm.

FIG. 3 illustrates a signal exchange procedure between devices, through which a network access request for traffic transmission is processed according to yet another embodiment of the present invention.

First, CP 31 invokes an action for designating one QoS policy holder 33, as default on a QoS manager 32 on a network (S20). Default QoS policy holder designated by the CP 31 can be set/changed by user option or menu such as environment setting provided by the CP 31. Meanwhile, identifying information (policyholderID) designating a QoS policy holder is contained as an input argument of the designation action. In addition, even though a plurality of QoS managers exists on the network, the default QPH designation action as above is invoked only on a single QoS manager.

QoS manager 32 which received the designation action invokes an action for designating a QoS policy holder 33, corresponding to the identifier designated among multiple QoS policy holders as default QoS policy holder S21. QoS policy holder 331 which received the designation action sets a state variable "DefaultQPH" as TRUE, the state variable indicating a default policy holder. Meanwhile, when the QoS manager 31 invokes an action for designating a designated QoS policy holder 33, as default QoS policy holder, an action for requesting reset of a default QoS policy holder (ResetDefaultQPH( )) is invoked on the remaining QoS policy holders $33_2, \ldots, 33_K$ which are not designated. This is intended to avoid a situation where different QoS policy holders co-exist in the state of a default QPH due to other default QPHs being designated before the designation of a current default QPH. In another embodiment according to the present invention, a state variable indicating a default policy holder can store identifying information of a default policy holder.

When traffic connection request for streaming or transmission between devices is issued by the user through the control point 31 after setting a default QoS policy holder as above (S31), the control point 31 configures TD information for the connection according to the user input or selection information acquired from an appropriate user interface and invokes an action for requesting connection permission on the QoS manager 32 (S32). As described above, the configured TD information contains type of data requested for access, identifying information about the user, etc. In the present embodiment, identifying information (policyholderID) of a QoS policy holder determining priority of requested access is not included in the input argument of an action for requesting the access permission. What is implied by the fact that identifying information of a QoS policy holder is not included is that the value of a variable policyholderID within input argument of the action is set to 'NULL'.

The QoS manager 32 which received an action for requesting the connection extracts information contained in input argument within the action and checks QoS policy holder identifying information (policyholderID) within the information. When the value of the checked identifier is NULL, the QoS manager 32 carries out an operation of discovering all of QoS policy holders in order to identify a default QoS policy holder (S33). According to the discovery, description information of each QoS policy holder is received, the description information including the value of a state variable "defaultQPH" indicating a default policy holder as well. Therefore, the QoS manager 32 requests inquiry of priority information according to traffic policy on the QoS policy holder $33_1$ identified by the discovery action, while providing received TD information along with a connection request (S34).

The QoS policy holder 331 which received the inquiry request determines priority information according to a priority determination policy or algorithm previously set thereto. This determination is made by applying information such as identifying information of the user who requested access, type of traffic requested for access (e.g., whether the traffic is intended for A/V data or external call in case of emergency), etc to its policy or algorithm. According to the determination, e.g., information about TIN (Traffic Importance Number) and UIN (User Importance Number) is determined as priority information and this information is returned to the QoS manager 32 in response to the inquiry request (S34), (S35). From returned priority information, UIN is managed by the QoS manager 32 and TIN is inserted to the TD information; the TD information is then carried by an action and permission for accessing a network is requested on a QoS device 14 (S36).

The procedure of the QoS device's 14 allowing or refusing transmission speed requested by the TD information is the same as that of the embodiment described with reference to FIG. 1. In addition, when request for access permission is refused, the QoS manager 32 processes refusal of the access permission in the same way as the embodiment described with reference to FIG. 1.

According to the embodiment as described above, access permission for traffic can be determined by a priority determination method under the same condition. If the identifying information of a default QoS policy holder is allowed to be changed by the CP 31, the user can change the identifying information into a different QoS policy holder from a currently set one by using a user option or environment setting of the CP 31. Also, while a single default QoS policy holder is designated and maintained, determination of priority for access requested on the network is performed in a consistent way according to the same policy or algorithm.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for determining priority to access a network, the method comprising:
 designating one of a plurality of priority determinators as a specific priority determinator; and
 requesting priority information about a connection from the designated specific priority determinator if permission of the connection for traffic is requested,
 wherein information about the designated specific priority determinator is used in the specific priority determinator as information indicating whether or not a priority determinator is the designated specific priority determinator or as information identifying the designated specific priority determinator, and
 wherein requesting the priority information comprises identifying the designated specific priority determinator by receiving information specifying the designated specific priority determinator and requesting the priority information from the identified designated specific priority determinator.

2. The method of claim 1, further comprising resetting each of the plurality of priority determinators except the designated specific priority determinator when the specific priority determinator is designated.

3. The method of claim 1, wherein requesting the priority information is performed if information received with the request for connection permission has no information related to designating the specific priority determinator.

4. The method of claim 1, wherein requesting the priority information comprises supplying information about a user and data received with the request for connection permission to the designated specific priority determinator.

5. The method of claim 1, wherein the priority information comprises priority assigned to traffic and priority assigned to a user.

6. The method of claim 5, wherein the priority assigned to the traffic is expressed as a traffic importance number and the priority assigned to the user is expressed as a user importance number.

7. The method of claim 1, further comprising:
 requesting connection permission from a device transferring traffic on the network while providing the device with at least a portion of the priority information received from the specific priority determinator,
 wherein the at least a portion of the priority information is included in information sent with the request for connection permission.

8. The method of claim 1, wherein the specific priority determinator is a QoS (quality of service) policy holder defined in Universal Plug and Play (UPnP) protocol.

9. The method of claim 1, wherein the information for indicating whether or not the priority determinator is the designated specific priority determinator is a Boolean value.

10. The method of claim 1, wherein the information specifying the designated specific priority determinator is received by a discovering action for identifying which priority determinator is designated.

11. An apparatus for determining priority to access a network, comprising:
 a service quality manager configured to request priority information about a connection from a specific priority determinator if permission of the connection for traffic is requested, the specific priority determinator being designated as a specific one among a plurality of priority determinators,
 wherein information about the designated specific priority determinator is used in the specific priority determinator as information indicating whether or not a priority determinator is the designated specific priority determinator or as information identifying the designated specific priority determinator, and
 wherein the service quality manager is further configured to request the priority information by identifying the designated specific priority determinator by receiving information specifying the designated specific priority determinator and requesting the priority information from the identified designated specific priority determinator.

12. The apparatus of claim 11, wherein the service quality manager is further configured to reset each of the plurality of priority determinators except the designated specific priority determinator when the specific priority determinator is designated.

13. The apparatus of claim 11, wherein the service quality manager is further configured to request the priority information from the specific priority determinator if information received with the request for connection permission has no information related to designating the specific priority determinator.

14. The apparatus of claim 11, wherein the service quality manager is further configured to supply information about a user and data received with the request for connection permission to the designated specific priority determinator when requesting the priority information.

15. The apparatus of claim 11, wherein the priority information comprises priority assigned to traffic and priority assigned to a user.

16. The apparatus of claim 15, wherein the priority assigned to the traffic is expressed as a traffic importance number and the priority assigned to the user is expressed as a user importance number.

17. The apparatus of claim 11, wherein the service quality manager is further configured to request connection permission from a device transferring traffic on the network while providing the device with at least a portion of the priority information received from the specific priority determinator, the at least a portion of the priority information included in information sent with the request for connection permission.

18. The apparatus of claim 11, wherein the specific priority determinator is a QoS (quality of service) policy holder defined in Universal Plug and Play (UPnP) protocol.

19. The apparatus of claim 11, wherein the information for indicating whether or not the priority determinator is the designated specific priority determinator is a Boolean value.

20. The apparatus of claim 11, wherein the information specifying the designated specific priority determinator is received by a discovering action for identifying which priority determinator is designated.

* * * * *